(12) United States Patent
Bousetouane et al.

(10) Patent No.: US 12,229,813 B2
(45) Date of Patent: *Feb. 18, 2025

(54) SYSTEM AND METHOD FOR PROVIDING THREE-DIMENSIONAL, VISUAL SEARCH

(71) Applicant: W.W. Grainger, Inc., Lake Forest, IL (US)

(72) Inventors: Fouad Bousetouane, Vernon Hills, IL (US); Srikanth Ojasve, Lake Forest, IL (US); Nirav Saraiya, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 424 days.

This patent is subject to a terminal disclaimer.

(21) Appl. No.: 17/698,172

(22) Filed: Mar. 18, 2022

(65) Prior Publication Data

US 2022/0207585 A1 Jun. 30, 2022

Related U.S. Application Data

(63) Continuation-in-part of application No. 17/148,725, filed on Jan. 14, 2021, now Pat. No. 12,141,851.

(Continued)

(51) Int. Cl.
*G06V 10/74* (2022.01)
*G06F 16/532* (2019.01)

(Continued)

(52) U.S. Cl.
CPC ....... *G06Q 30/0623* (2013.01); *G06F 16/532* (2019.01); *G06V 10/74* (2022.01); *G06V 20/64* (2022.01)

(58) Field of Classification Search
CPC .............. G06Q 30/0623; G06F 16/532; G06F 16/9038; G06V 10/74; G06V 20/64; G06V 20/20
See application file for complete search history.

(56) References Cited

U.S. PATENT DOCUMENTS 9,411,413 B2  8/2016  Motta et al.
9,414,413 B2  8/2016  Park
(Continued)

OTHER PUBLICATIONS

Baker, Natasha, "New apps help shoppers identify items using image recognition," Aug. 26, 2013, Reuters, accessed at [https://www.reuters.com/article/us-apps-pou nee/ new-apps-help-shoppers-identify-items-using-image-recognition-idUSBRE97P06J20130826] (Year: 2013).

(Continued)

*Primary Examiner* — Ming Y Hon
(74) *Attorney, Agent, or Firm* — Barnes & Thomburg LLP

(57) ABSTRACT

A system and method determines that an object within an image frame being captured via use of an imaging system is an object of interest. The determined object of interest is used to extract from a three-dimensional information obtained via use of a three-dimensional (3D) data obtaining component of the imaging system a 3D information for the object of interest. At least a part of the 3D information for the object of interest is caused to be provided to a cloud-based visual search process for the purpose of locating one or more matching products from within a product database for the object of interest with the located one or more matching products being returned to a customer as a product search result.

15 Claims, 15 Drawing Sheets

Related U.S. Application Data

(60) Provisional application No. 63/165,389, filed on Mar. 24, 2021, provisional application No. 63/076,741, filed on Sep. 10, 2020, provisional application No. 63/048,704, filed on Jul. 7, 2020.

(51) Int. Cl.
  *G06Q 30/0601*    (2023.01)
  *G06V 20/64*     (2022.01)

(56) References Cited

U.S. PATENT DOCUMENTS

| | | | |
|---|---|---|---|
| 9,424,461 B1 | 8/2016 | Yuan | |
| 9,760,778 B1 | 9/2017 | Wakim | |
| 10,101,831 B1 * | 10/2018 | Dand | H04N 23/63 |
| 10,733,651 B2 * | 8/2020 | Hansen | G06Q 30/0643 |
| 11,274,929 B1 * | 3/2022 | Afrouzi | G06T 7/62 |
| 11,501,528 B1 | 11/2022 | Krishnan Gorumkonda | |
| 2013/0188886 A1 * | 7/2013 | Petrou | G06F 16/50 |
| | | | 382/305 |
| 2013/0293580 A1 * | 11/2013 | Spivack | G06V 20/20 |
| | | | 345/633 |
| 2013/0328926 A1 * | 12/2013 | Kim | G06T 11/60 |
| | | | 345/633 |
| 2015/0248719 A1 * | 9/2015 | Hansen | G06Q 30/0627 |
| | | | 705/26.63 |
| 2017/0124618 A1 | 5/2017 | Roeseler | |
| 2017/0124717 A1 * | 5/2017 | Baruch | G06T 7/136 |
| 2018/0005407 A1 * | 1/2018 | Browning | G05D 1/024 |
| 2018/0184065 A1 * | 6/2018 | Zhao | H04N 13/271 |
| 2018/0240259 A1 | 8/2018 | Zamer | |
| 2018/0300557 A1 * | 10/2018 | Rodenas | G08B 13/19613 |
| 2019/0020823 A1 * | 1/2019 | Jeon | G06V 20/20 |
| 2019/0043003 A1 * | 2/2019 | Fisher | G06N 3/045 |
| 2019/0065851 A1 | 2/2019 | Cardis | |
| 2019/0066304 A1 | 2/2019 | Hirano | |
| 2019/0087952 A1 * | 3/2019 | Milbert | G06V 30/424 |
| 2019/0147614 A1 | 5/2019 | Hamzic et al. | |
| 2019/0251701 A1 * | 8/2019 | Shukla | G06N 3/006 |
| 2019/0253626 A1 * | 8/2019 | Li | B64C 39/024 |
| 2019/0286912 A1 * | 9/2019 | Chan | G06V 10/235 |
| 2019/0294879 A1 | 9/2019 | Tibau-Puig | |
| 2019/0391715 A1 | 12/2019 | Joyce | |
| 2019/0392212 A1 * | 12/2019 | Sawhney | G06T 7/70 |
| 2019/0392589 A1 * | 12/2019 | Hirakawa | G06V 20/52 |
| 2020/0099892 A1 * | 3/2020 | Erol | H04N 5/77 |
| 2020/0364832 A1 * | 11/2020 | Hu | G06V 20/10 |
| 2020/0371673 A1 * | 11/2020 | Faulkner | G06F 3/017 |
| 2020/0401802 A1 * | 12/2020 | Grant | G06F 16/5866 |
| 2021/0018316 A1 | 1/2021 | Nakamura et al. | |
| 2021/0019944 A1 * | 1/2021 | McKeever | G06T 19/006 |
| 2021/0232212 A1 * | 7/2021 | Stolzenberg | G06F 3/012 |
| 2021/0264369 A1 * | 8/2021 | Zass | G06F 8/70 |
| 2021/0334579 A1 | 10/2021 | Sussman et al. | |
| 2021/0334879 A1 * | 10/2021 | Sussman | G06Q 30/0282 |
| 2021/0336784 A1 * | 10/2021 | Athlur | H04L 63/0442 |
| 2021/0346557 A1 * | 11/2021 | Brooks | G05D 1/617 |
| 2021/0383673 A1 * | 12/2021 | Croxford | G08B 13/19613 |
| 2021/0407108 A1 * | 12/2021 | Sharma | G06T 7/248 |
| 2022/0076021 A1 * | 3/2022 | Iyengar | G06V 10/22 |
| 2022/0137647 A1 * | 5/2022 | Qian | G05D 1/0094 |
| | | | 703/1 |
| 2022/0232169 A1 * | 7/2022 | Araújo | G06T 5/73 |
| 2023/0169625 A1 * | 6/2023 | Kumar | G06T 7/70 |
| | | | 382/284 |

OTHER PUBLICATIONS

Final Office Action from U.S. Appl. No. 17/148,725, dated Jun. 13, 2023, 15 pp.
Final Office Action from U.S. Appl. No. 17/199,146, dated Jul. 7, 2023, 24 pp.
Non-final Office Action from U.S. Appl. No. 17/199,146, dated Mar. 2, 2023, 23 pp.
Final Office Action from U.S. Appl. No. 17/199,146, dated Feb. 15, 2024, 25 pp.
Non-final Office Action from U.S. Appl. No. 17/148,725, dated Oct. 6, 2023, 16 pp.
Non-final Office Action from U.S. Appl. No. 17/199,146, dated Oct. 26, 2023, 27 pp.
ISA/US, Int. Search Report and Written Opinion issued on PCT application No. PCT/US22/21280, dated Jun. 9, 2022, 10 pages.
Non-final Office Action from U.S. Appl. No. 17/148,725, dated Apr. 16, 2024, 14 pp.
US Patent and Trademark Office, Office Action Issued in U.S. Appl. No. 17/148,725, dated Nov. 21, 2022, 13 pages.

* cited by examiner

SYSTEM AND METHOD FOR PROVIDING THREE-DIMENSIONAL, VISUAL SEARCH

RELATED APPLICATION INFORMATION

This application claims the benefit of U.S. Provisional Application No. 63/165,389, filed on Mar. 24, 2021.

This application is also a continuation-in-part of and claims the benefit of U.S. application Ser. No. 17/148,725, filed on Jan. 14, 2021, which application claims the benefit of U.S. Provisional Application No. 63/048,704, filed on Jul. 7, 2020, and U.S. Provisional Application No. 63/076,741, filed on Sep. 10, 2020.

The disclosure within each of the applications from which priority is claimed is incorporated herein by reference in its entirety.

BACKGROUND

As described in U.S. Pat. No. 9,411,413 and U.S. Publication No. 2021/018316, which publications are incorporated herein by reference in their entirety, Light Detection And Ranging (LiDAR) is a known sensing method usable to measure and extract an exact distance of an object/surface from a device. Generally, the LiDAR process sends pulses of light and calculates the time it takes for the pulses of light to return to the LiDAR source. The calculated time is used to determine the distance of the object from the device.

SUMMARY

The following describes systems and methods or using 3D sensors, particularly LiDAR sensors, and CAD models to provide better product matching during a visual search process.

A better understanding of the objects, advantages, features, properties, and relationships of the hereinafter described systems/methods will be obtained from the following detailed description and accompanying drawings which set forth illustrative embodiments and which are indicative of the various ways in which the principles of the described systems/methods may be employed.

BRIEF DESCRIPTION OF THE DRAWINGS

Example systems and method for providing visual search, including three-dimensional visual search, will be described hereinafter with reference to the attached drawings in which.

DETAILED DESCRIPTION

The following describes a new and innovative visual search product that will utilize three-dimensional(3D) information to augment the visual search process. In a preferred example, the 3D information will include 3D image information, e.g., 3D information that is obtained via use of 3D sensors while imaging an object of interest (i.e., the product to be searched for), and 3D reference information, e.g., 3D product information (such as obtained from CAD drawing) stored in database. The 3D information can be used to provide product matching and product sizing capabilities to a visual search process.

In some instances, the visual search process can be performed using a "tap-less" capability. In general, the "tap-less" capability is achieved by combining object detection and tracking techniques with visual search and scene understanding technologies. In the "tap-less" search, object detection is performed on-device in real time on image frames captured via use of a camera (and 3D sensors as appropriate), data from object detection is presented in real time to the customer as visual cues for the prominent object being detected and tracked thus allowing the customer to choose the object of interest within a crowded scene, data from object detection is used for filtering out unnecessary information within the captured frame, and data from object detection is used as the input to the visual search process.

Object tracking is performed in real time in conjunction with object detection on the image frames captured via use of the camera. Data from object tracking, specifically the ID of the prominent object detected in the viewfinder frame, is used to present the customer with visual cues as to the data acquisition and to intuitively have the user stabilize the camera onto the object of interest.

Once the object of interest is in-focus, a visual search trigger algorithm will automatically cause product matching to be performed via use of a visual search engine that resides in the cloud. Multi-constrained optimization techniques are preferably used to choose the most-significant tracks in a given timeframe for triggering the cloud-based product matching process. Visual search is preferably performed in the cloud due to its algorithmically complex nature and the size of the products database. Thus, using the data captured during the object detection and tracking phase, the visual search engine will return to the customer one or more product matches for presentation to the customer via use of a computing device.

Figure 1:
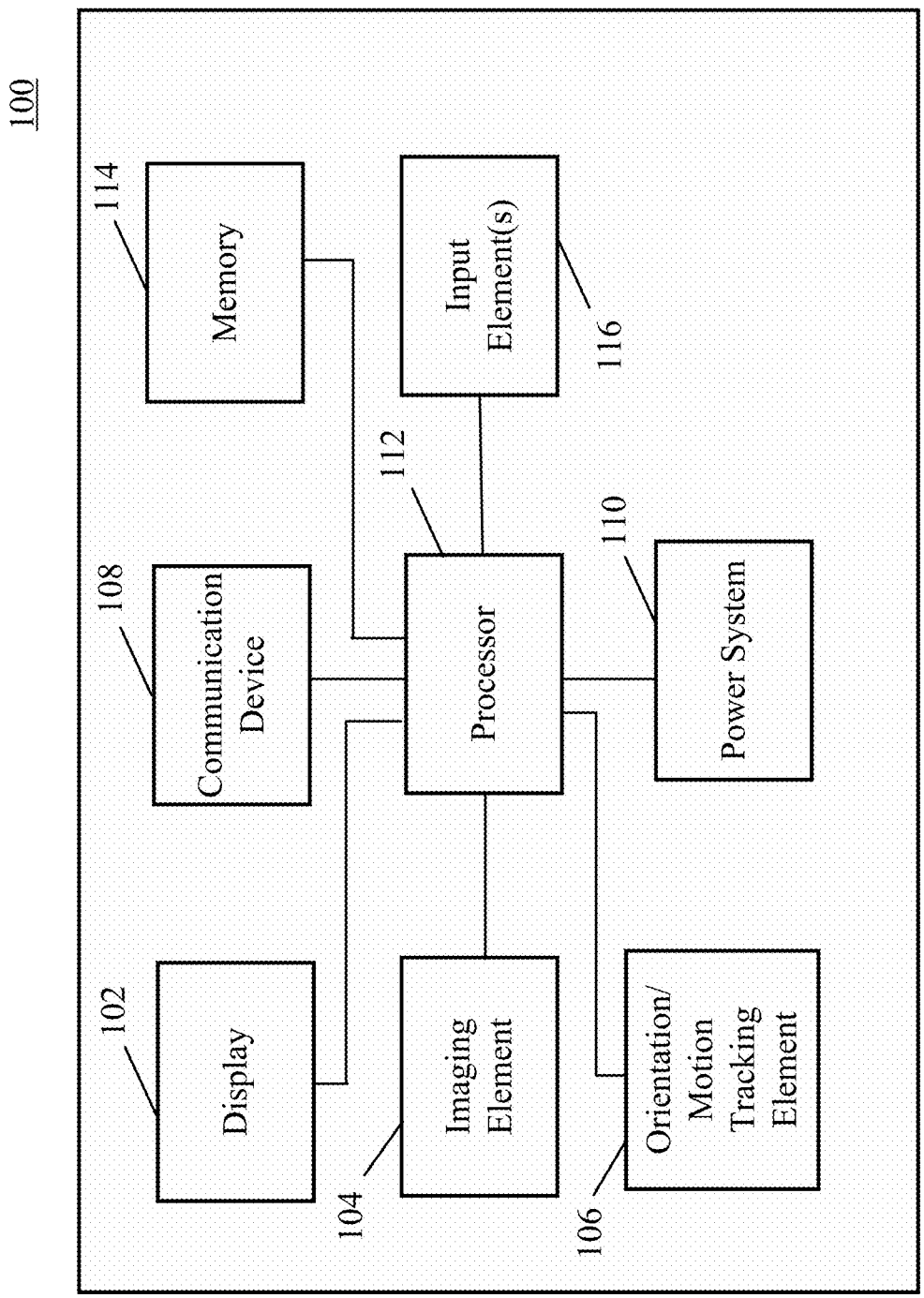
FIG. 1 illustrates an example computing device for use in capturing image frame information.

Turning now to FIG. 1, FIG. 1 illustrates, in block diagram form, an example computing device 100 usable with the subject app. Preferably, the computing device 100 is in the form of a mobile computing device e.g., a smartphone, an electronic book reader, or tablet computer. However, it is to be understood that any device capable of receiving and processing input can be used in accordance with the various embodiments discussed herein. Thus, a computing device 100 can include desktop computers, notebook computers, electronic book readers, personal data assistants, cellular phones, video gaming consoles or controllers, television set top boxes, and portable media players, among other devices so long as the device includes or is capable of being coupled to a movable image capturing element.

For use in connection with the visual search process, the computing device 100 has an associated display and one or more image capture elements 104. Aa discussed further below, the image capture elements can include one or more 3D sensors, such as a LiDAR scanner which is included as a component part of an "Apple" brand "iPhone" brand cellular phone. The display may be a touch screen, electronic ink (e-ink), organic light emitting diode (OLED), liquid crystal display (LCD), or the like element, operable to display information or image content to one or more customers or viewers of the computing device 100. Each image capture element 104 may be, for example, a camera, a charge-coupled device (CCD), a motion detection sensor, an infrared sensor, a 3D sensor, or other image capturing technology as needed for any particular purpose. As discussed, the computing device 100 can use the image frames still or video captured from the one or more image capturing devices 104 to capture data representative of an object of interest whereupon the captured image information can be analyzed to recognize the object of interest. Image capture can be performed using a single image, multiple images, periodic imaging, continuous image capturing, image streaming, etc. Further, the computing device 100 can include the ability to start and/or stop image capture, e.g., stop the visual search process, such as when receiving a command from a user, application, or other device.

As further shown in FIG. 1, the computing device 100 also includes one or more orientation-determining and/or position-determining elements 106 operable to provide information such as a position, direction, motion, and/or orientation of the computing device 100. These elements can include, for example, accelerometers, inertial sensors, electronic gyroscopes, and/or electronic compasses without limitation. Meanwhile, for communicating data to remotely located processing devices, the computing device 100 preferably includes at least one communication device 108, such as at least one wired or wireless component operable to communicate with one or more electronic devices, such as a cell tower, wireless access point ("WAP"), computer, or the like.

As yet further illustrated in FIG. 1, these and other components are coupled to a processing unit 112 which will execute instructions, including the instructions associated with a visual search related app, that can be stored in one or more memory devices 114. As will be apparent to one of ordinary skill in the art, the computing device 100 can include many types of memory, data storage, or computer-readable media, such as a first data storage for program instructions for execution by the processing unit(s) 112, the same or separate storage for images or data, a removable memory for sharing information with other devices, etc.

To provide power to the various components of the computing device 100, the computing device 100 also includes a power system 110. The power system 110 may be a battery operable to be recharged through conventional plug-in approaches, or through other approaches such as capacitive charging through proximity with a power mat or other such device.

In some embodiments the computing device 100 can include at least one additional input device 116 able to receive conventional input from a user. This input device 116 can include, for example, a push button, touch pad, touch screen, wheel, joystick, keyboard, mouse, keypad, or any other such device or element whereby a user can input a command to the device. These I/O devices could even be connected by a wireless infrared. Bluetooth, or other link in some embodiments. Some devices also can include a microphone or other audio capture element that accepts voice or other audio commands. As will be appreciated, the input device 116 can, among other things, be used to launch the app and to close the app as desired.

Figure 2:
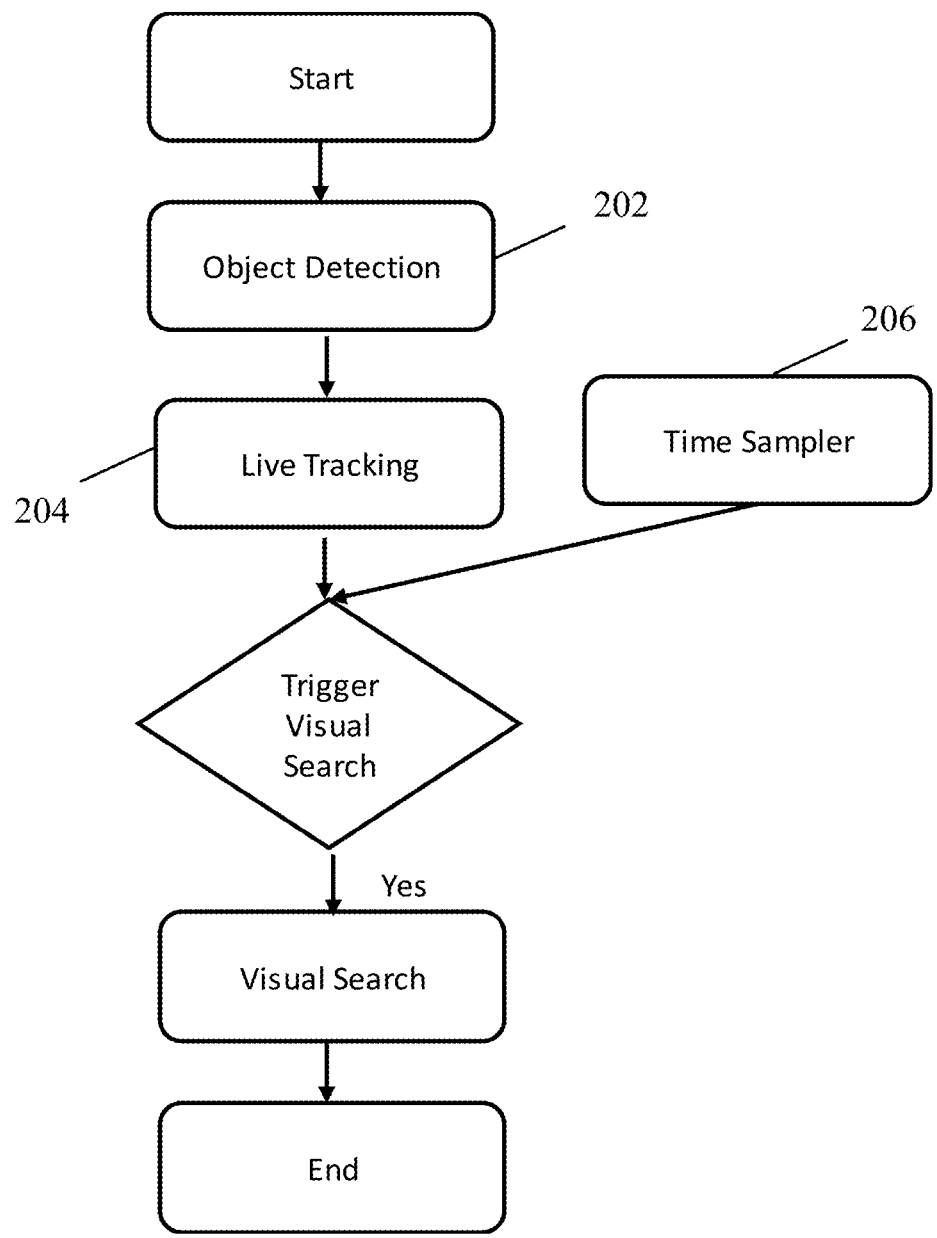
FIG. 2 illustrates an example method for implementing object detection and tracking and visual search using the captured image frame information.

Turning to FIG. 2, in a preferred embodiment of the subject system the object detection 202 and tracking 204 processes are performed on-device, for example as soon as the customer launches a visual search related app on the computing device 100. Once launched, the customer will point the imaging element(s) 104 towards the object of interest and, as the customer trains the camera on the scene that includes the object of interest, object detection and tracking will be performed on every frame presented to the user within the viewfinder that is caused to be displayed in the display 102 of the computing device 100. Object detection and tracking will be performed under real-time constraints, i.e., the process will consider the device processing power and frame processing may be skipped when necessary in order to achieve a real-time fluid experience.

Figure 4:
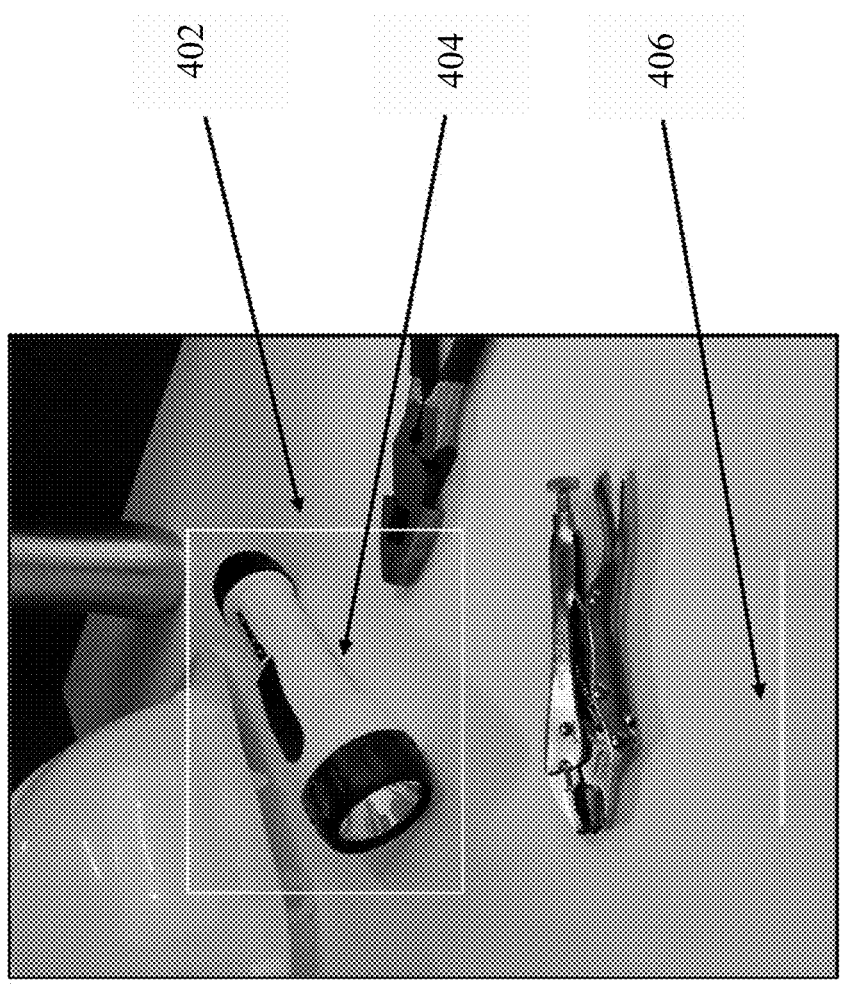
FIG. 4 illustrates an example of an object detection and tracking process as it is being performed on the computing device of FIG. 1.

While object detection may detect multiple objects within the viewfinder's frames, only the most prominent detected object shall be tracked and visually cued to the customer, allowing the customer to select the object of interest within a crowded scene by simply pointing the camera 104 towards that object and keeping the camera 104 focused on that object for a predetermined period of time 206 To assist the customer during this process, the viewfinder presented in the display 10, an example of which is illustrated in FIG. 4, may provide the customer with an indicia 402, such as a bounding box, that functions to emphasize the current focus of the camera 104, i.e., the current object of interest 404 within the scene, and a progress indicator 406 that indicates to the customer the amount of time the camera 104 has been focused on the object of interest 404 and, accordingly, the amount of time before the search process will be automatically triggered. Thus, as shown in FIG. 5A-5F, once the customer has trained the camera 104 on the object of interest 404 for a sufficient period of time, which is indicated to customer in this example by the filling of progress indicator 406 in the form of a progress bar, the system will automatically commence the process of matching the object of interest 404. If, however, the customer refocuses the camera 104 onto a different object of interest 404' prior to the expiry of the measured time, the process will recommence. The viewfinder can further provide an indication to the customer when the search process has been automatically triggered, for example by changing/darkening the view of the scene as presented to the customer as shown in FIG. 5E as compared to FIG. 5D. It will also be appreciated that the example visual progress indicator 406 can also be associated with or alternatively implemented as an audible progress indicator.

As noted above, data from object detection is preferably presented in real-time to the customer in visual form, for example in the form of a bounding box 402 of the most prominent object 404 detected, overlaid on top of the captured image displayed in the viewfinder. This highlighting 402 of the object of interest 404 to the customer achieves two goals. First and foremost, highlighting 402 the object of interest 404 guides the customer into choosing the object of interest 404 from many objects within the field of view. Additionally, highlighting 402 the object of interest 404 guides the customer into bringing the object of interest 404 into a position of prominence in the field of view thus implicitly improving product matching by improving the captured object data used for product matching. Yet further, the prominent detected object's bounding box in this example—which defines an area of interest within the captured frame—may be used for filtering out unnecessary information (e.g., busy scenery or adjacent objects within the captured frame) from the captured image frame when performing the visual search process, thus improving product matching. Still further, data from object detection, specifically the prominent detected object bounds within the captured frames, may be used to crop the object image from the captured frame and these object images may be stored for optimally choosing the best data as input to the visual search process.

Data from object tracking, such as the ID of the prominent object being detected and tracked, is additionally used in connection with the progress indicator 406. For example, while the ID of the prominent object being detected and tracked remains unchanged over consecutive frames, the system may function to fill the progress bar in keeping with the embodiment illustrated in FIGS. 5A-5E. If, however, the value of the tracking ID changes then the progress indicator 406 will be reset to indicate to the customer that a new object has gained prominence and the device is now gathering data for that object. The use of object tracking in this manner will intuitively train the user into stabilizing the camera viewfinder onto the object of interest 404.

Once triggered, visual search is preferably performed in the cloud due to its algorithmically complex nature and the size of the products database. The input to the visual search is the data captured during the object detection phase, preferably after being subjected to a multi-constrained optimization technique that functions to choose the most-significant tracks in a given time-frame. In further embodiments the data may simply be an optimally chosen image of the prominently detected object.

Figure 5B:
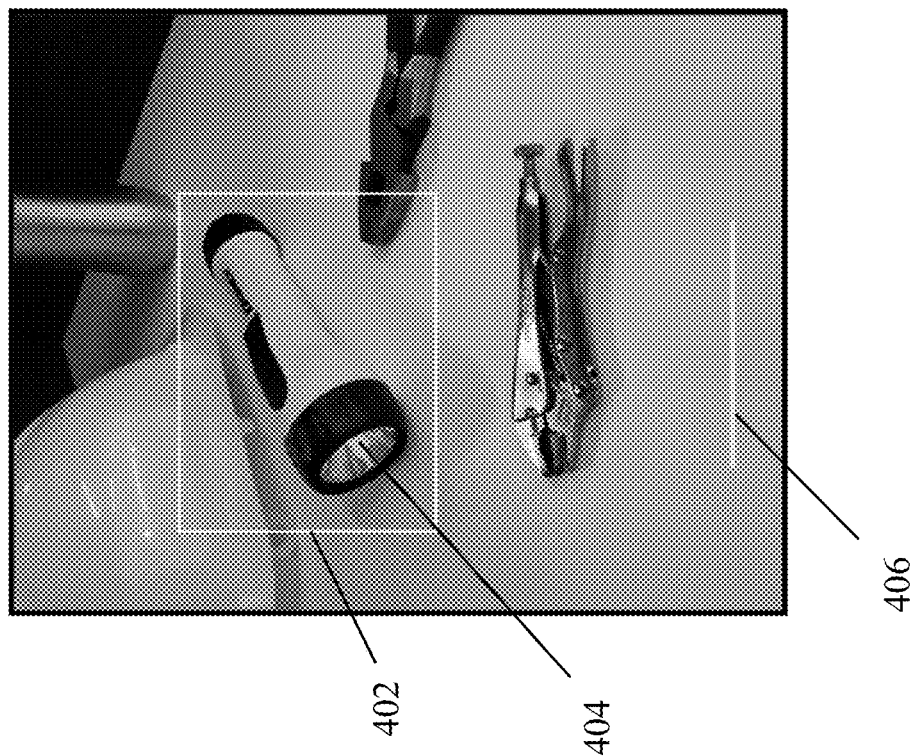
FIGS. 5A-5F illustrate an additional example of an object detection and tracking and visual search process as it is being performed on the computing device of FIG. 1.
Figure 5A:
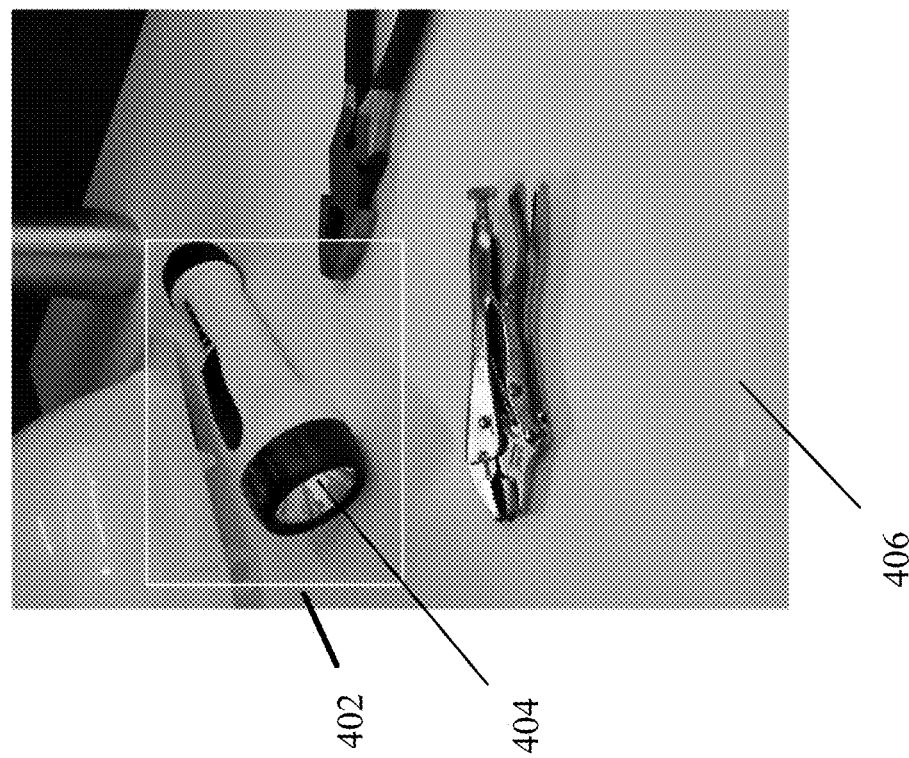
Figure 5D:
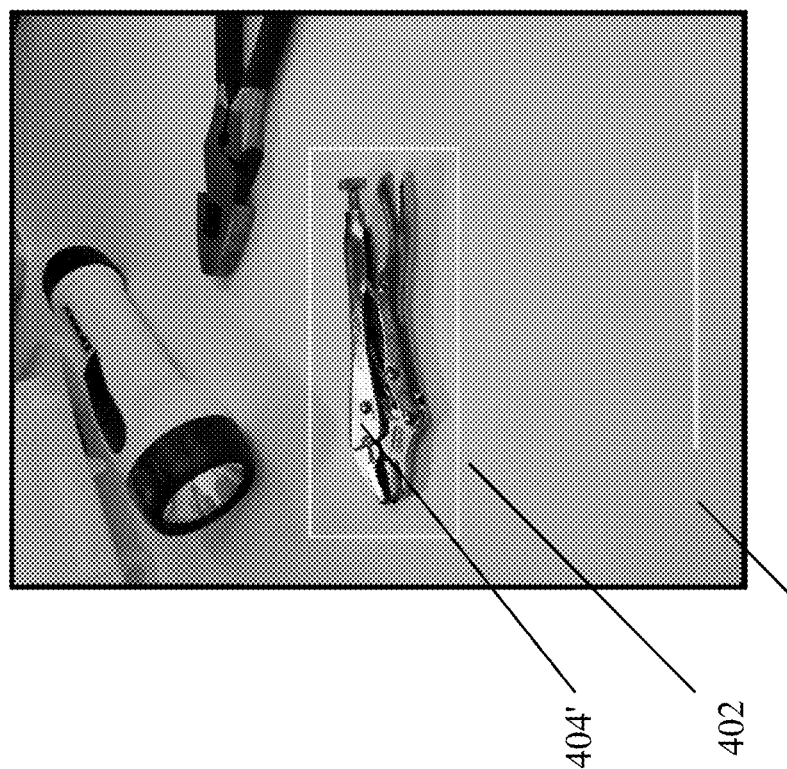
Figure 5C:
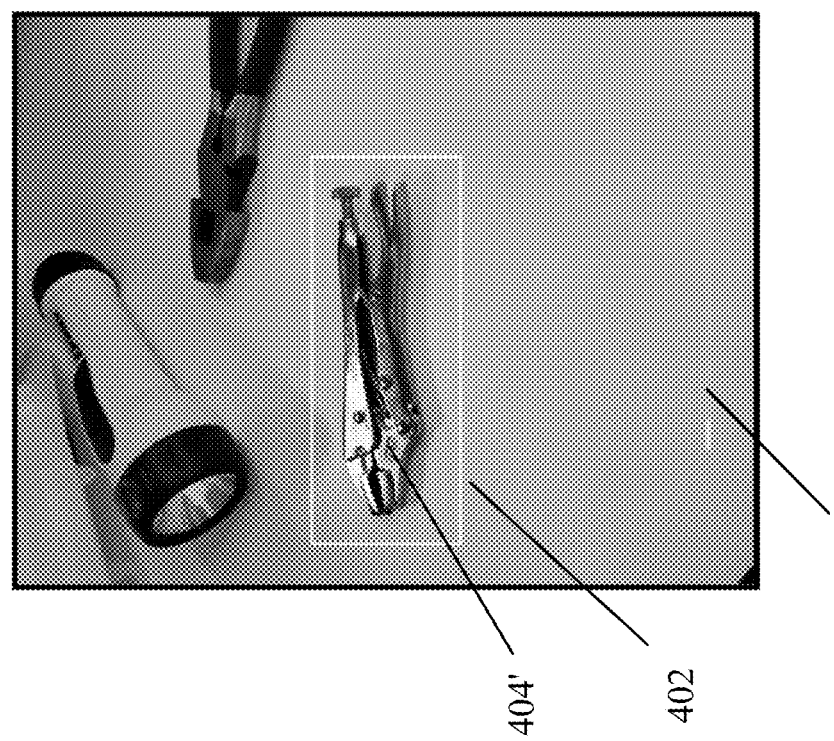
Figure 5F:
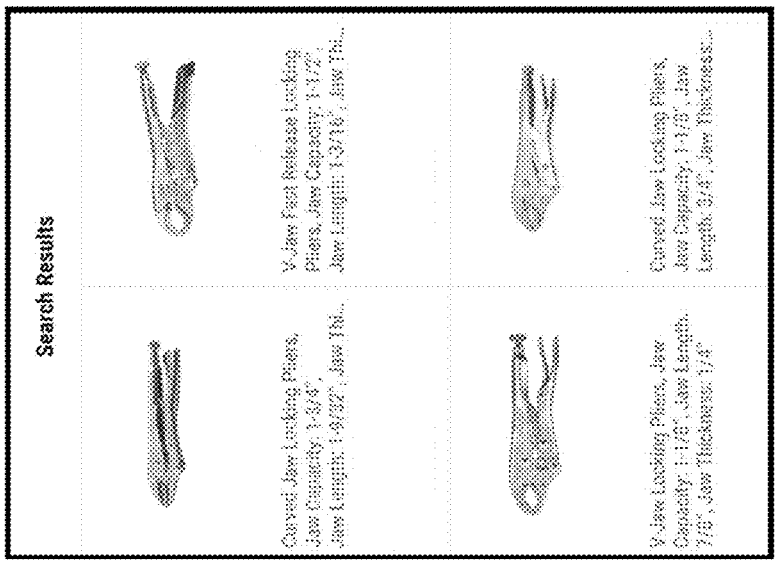
Figure 5E:
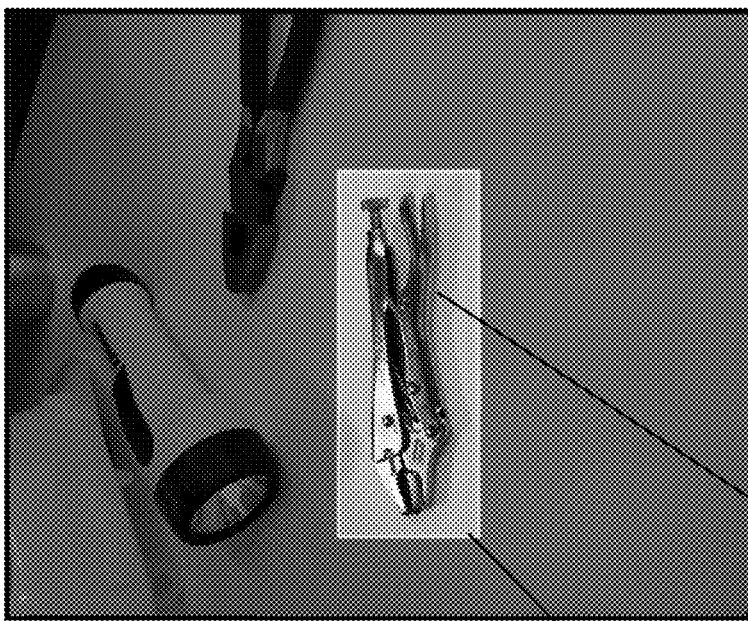

As particularly illustrated in FIG. 5F, the output of the visual search may be product match IDs that can be thereafter translated into product metadata (product name, brand, images, price, availability etc.) and presented to the customer as purchasing options. For this purpose, the cloud-based visual search engine will have access to product data that is to be used during the matching process where that product data is further cross-referenced in one or more associated data repositories to the product metadata. The product metadata may then be provided to the computing device 100 of the customer for display whereupon the customer may interact with the product information to perform otherwise conventional e-commerce related actions, e.g., to place product into a shopping cart or list, to purchase product, etc.

In some instances, it may be desirable to pre-process the image information prior to the image information being provided to the visual search engine. A non-limiting example of a pre-processing technique is a cross-frames brightness correction technique that may be employed to enhance the object detection and tracking outcome. In addition, image stabilization techniques, such as the monitoring of the rotation vector as part of the exposed mobile OS motion sensors APIs, may be used to enhance the quality of the captured data during the object detection and tracking phase.

Figure 3:
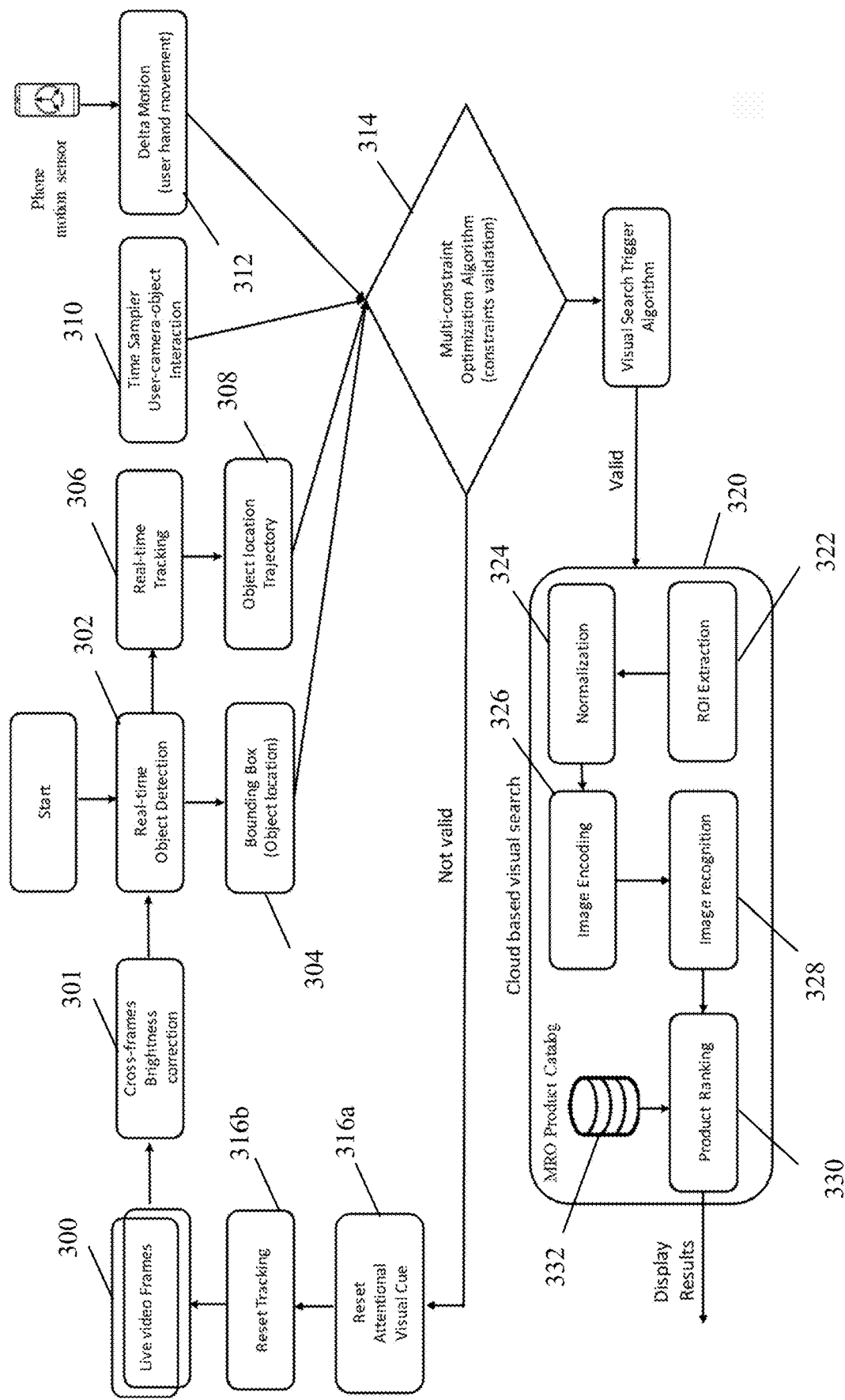
FIG. 3 illustrates components of an example system/method for implementing object detection and tracking and visual search.

Turing now to FIG. 3, an example system/method that combines object detection and tracking techniques with visual search and scene understanding technologies to thereby provide a "tap-less" visual search capability is illustrated. As discussed above, when the subject app is launched, the system uses a real-time object detection component 302 to detect objects within a scene 300 that is being pointed to by a camera 104 of the computing device 100. The object detection component 302 can be implemented using, for example, "GOOGLE's FIREBASE" brand toolbox. The object detection component will provide output that identifies areas of possible interest in the frame, e.g., defines bounding boxes in the frame. While not required, the frames 300 can be provided to correction component 301 that functions to process the frames to reduce noise prior to the frames being provided to the real-time object detection component 302.

The output from the real-time object detection component 302 may then be provided to a bounding box/object locating component 304. The bounding box/object locating component 304 is intended to identify, via use of the data that is output by the real-time object detection component 302, the bounding-box with the highest confidence, i.e., identify the location of the object of interest within the frame. The output of the bounding box/object locating component 304, namely, the location within the image of the bounding-box surrounding the product of interest, is provided to the real-time tracking component 306. The real-time tracking component 306, in cooperation with the object location trajectory component 308, tracks the location of the bounding-box within the image to ensure that the camera is remaining focused on the same object through multiple frames/over time. These components may use a Kalman filter that functions to assign an ID to the object/bounding box location to assist in the location tracking procedure.

While the above described components are performing object detection and tracking, a time sampler component 310 is used to continuously capture the time a customer spends focusing on one object with the camera 104. In this example, the time sampler component 310 operates in conjunction with a motion detecting component 312 that uses data generated by the orientation/positioning element 106 of the mobile computing device 100 to track the motion of the mobile computing device 100 to determine if the customer is quickly shifting the focus from one object to another within the scene as described immediately below. It will also be appreciated that the output from the time sample component 310 may be used to update the progress indicator 406 as it is being presented in the viewfinder.

The data generated by the above components is provided to a multi-constraint optimization algorithm component 314 that functions to determine if visual search should be triggered or if processing should continue. More particularly, the multi-constraint optimization algorithm component 314 uses linear programming techniques to decide if the customer is interested in a given object, e.g., determines if the customer has kept the camera focused on the object for a predetermined amount of time. If the multi-constraint optimization algorithm component 314 determines that the customer is interested in the object in focus, the multi-constraint optimization algorithm component 314 will automatically trigger the visual search. If, however, the data indicates that the customer is not interested in the object in focus, e.g., the customer moves the computing device 100 prior to the expiry of the predetermined amount of time by an amount that changes the bounding box with the highest confidence/the ID of the object being tracked, the multi-constraint optimization algorithm component 314 will indicate to the system that the whole process must be reset 316, e.g., the system should reset the indicia 402, such as a bounding box, that functions to emphasize the current focus of the camera 104, and rest the progress indicator 406 that indicates to the customer the amount of time the camera 104 has been focused on the object of interest 404 within the viewfinder.

When the visual search process is automatically triggered, the image data is provided to the cloud-based, visual search engine 320. As further illustrated in FIG. 3, a region of interest ("ROI") extraction component 322 will use the coordinates that define that area of interest within the image frame, e.g., the coordinates of the bounding box, to extract from the image frame the object of interest. A normalization component 324 may be used to normalize, at the pixel level, the extracted image information and an encoding component 326 may be used to encode to base 64 the normalized, extracted image information prior to the extracted image information being operated on by the image recognition component 326. As will be appreciated by those of skill in the art, the image recognition component 326 uses one or more algorithms to recognize the object of interest, e.g., to locate one or more products within a database of product information 332 that is/are an exact or close match to the object of interest. The located one or more products located within the database may then be ranked by a ranking component 330, for example based upon a confidence level, whereupon the located product information will be returned to the computing device 100 for presentation to the customer.

Figure 6:
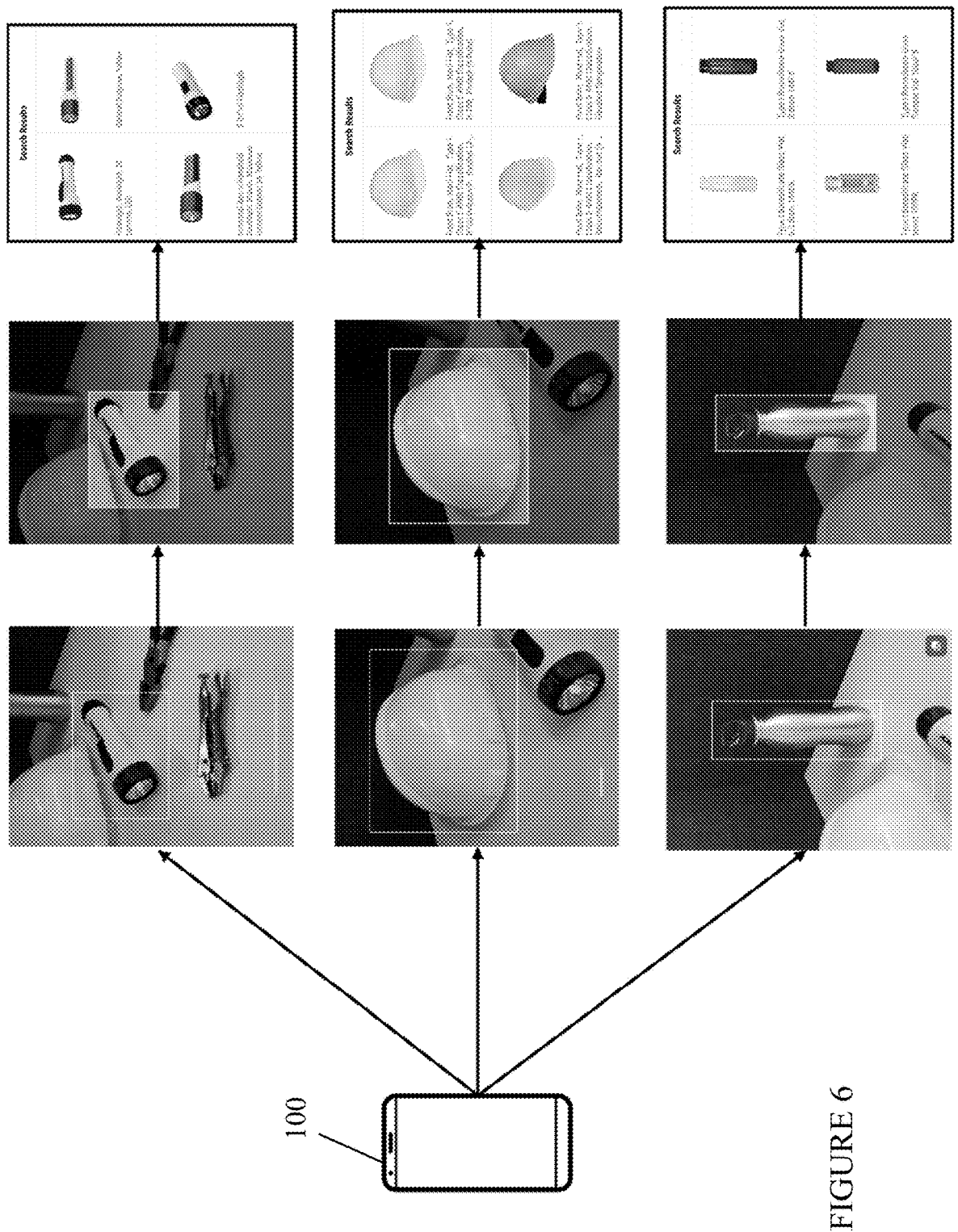
FIG. 6 illustrates an example of an object detection and tracking and visual search process as it is being performed on the computing device of FIG. 1 to obtain search results for multiple objects within a crowded scene.

In view of foregoing, it will be appreciated that the described systems and methods for providing tap-less, real-time visual search provide, among other things, an improved shopping experience for customers by allowing a customer to find a product's replacement (usually an exact match replacement or near exact replacement) where the only user interaction needed is pointing a camera towards an object of interest. Furthermore, as seen by the sample screen images illustrated in FIG. 6, which depict a computing device 100 being used to execute multiple product searches and to display the corresponding search results, the subject system and method has the advantage of seamlessly providing information about plural objects within a crowded scene simply in response to a customer pointing a camera towards each of the objects in turn.

Figure 7:
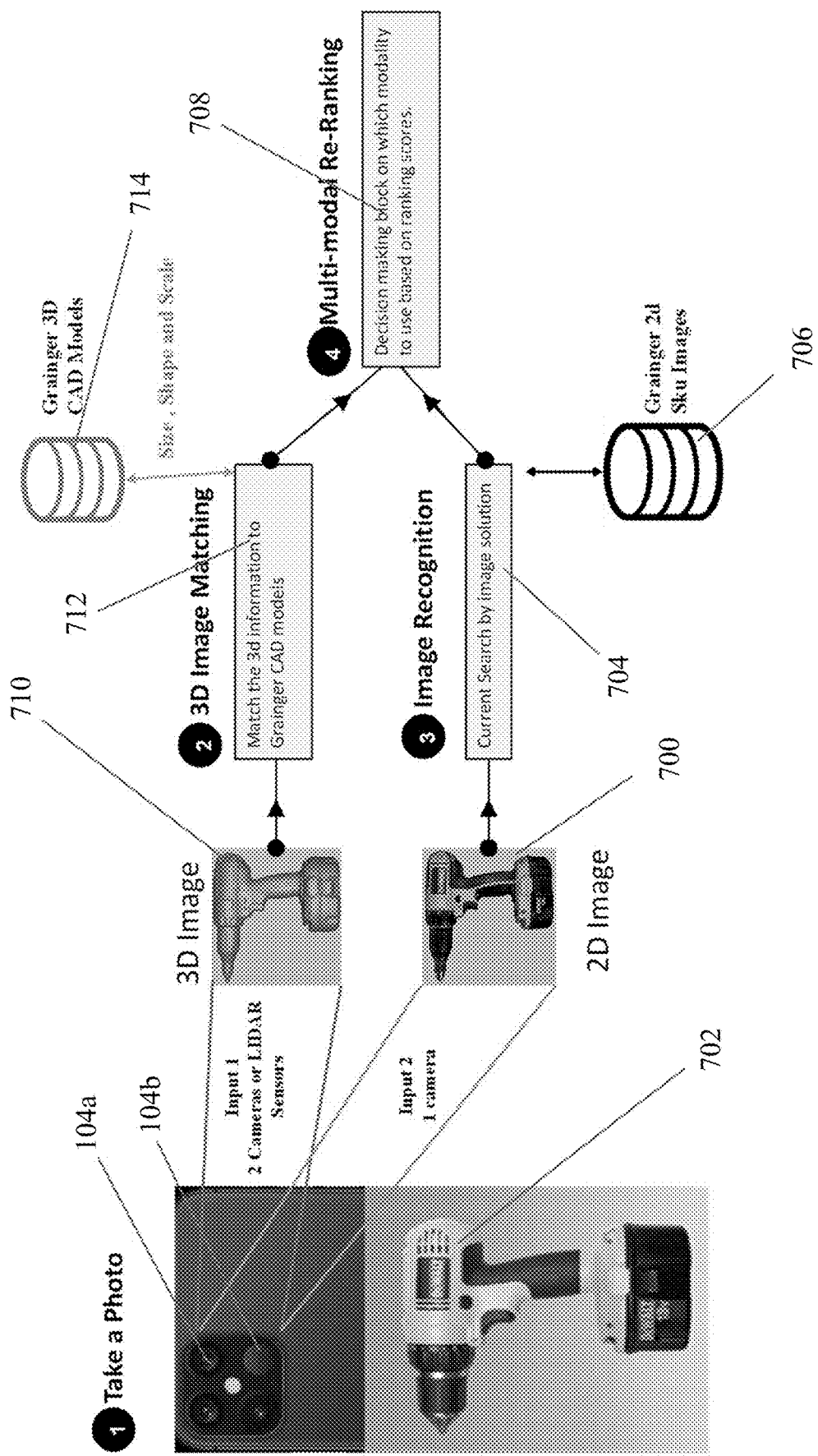
FIG. 7 illustrates an example method in which depth information is also used to provide product matching during the visual search process.

In a further example, which may or may not utilize the tap-less, search initiating feature described above, a visual search system will utilize 3D information in connection with the visual search process. As shown in FIG. 7, a first image capturing element 104a, e.g., a camera associated with a cell-phone 100, is used to obtain a two-dimensional (2D) image 700 of an object of interest 702, e.g., a cordless, power drill. The data associated with the 2D image 700 is, as described above, provided to a 2D visual search engine 704 and the 2D visual search engine 704 will use the data associated with the 2D image 700 to identity within a database of product information 706, e.g., a data store having 2D image data for product sold by a vendor that is cross-referenced to product identifying information, such as a vendor stock keeping unit (SKU), product pricing, product availability, product parameters (materials, etc.), and the like as needed for any particular purpose. The product information identified by the 2D visual search engine as being a match (or a close match) for the data associated with the 2D image 700 of the object of interest 702 is then provided to a multi-modal, re-ranking module 708.

In addition to processing the 2D image information obtained via use of the first image capturing element 104a, 3D image information 710 for the object of interest 702 is also caused to be obtained. The 3D image information 710 is obtained by using a 3D capable image capturing element 104b, such as a LiDAR sensor, and/or by using one or more 2D capable imaging capturing elements to create a stereoscopic image of the object of interest 702. The obtained 3D image information 710 for the object of interest 702 is then provided to a 3D visual search engine 712 and the 3D visual search engine 712 will use the obtained 3D image information 710 to identity within a database of product information 714, e.g., a data store having 3D image data, such as CAD data, for product sold by a vendor that is cross-referenced to product identifying information, such as a vendor stock keeping unit (SKU), product pricing, product availability, product parameters (materials, sizing, etc.), and the like as needed for any particular purpose. The product information identified by the 3D visual search engine as being a match (or a close match) for the data associated with the 3D image information 710 of the object of interest 702 is then also provided to a multi-modal re-ranking module 708.

Figure 8:
FIG. 8 illustrates an example search result resulting from an execution of the method illustrated in FIG. 7.

Once the 3D visual search engine results and the 2D visual search engine results are received by the multi-modal re-ranking module 708, the module 708 may determine, for example using a weighted score applied to the 2D visual search results, the 3D visual search results, and/or a combination of the visual search results, which one or more of the visual search results generated by the visual search engine(s) should be provided to a user. The determined "best" search results may then be returned to the user device 100 for display to the user. By way of example only, FIG. 8 shows a search result 800 that is caused to be displayed to a user of a visual search app executing on a device 100 when a cordless drill is caused to be an object of interest. As will be appreciated, the number of products included in the search result 800 can be varied as needed for any particular purpose. To this end, product search results not meeting a predetermined score threshold could be filtered from the search result 800, only the top X scored product search results could be included in the search result 800, or the like without limitation. As noted previously, the search results 800 can be accompanied with links to conventional e-commerce related functionalities as desired, e.g., links to add product to a shopping cart, to add product to a list, to navigate to a product detail page, etc.

It will be understood that the 3D visual search engine and the 2D visual search engine described in the preceding example need not be separate and distinct search engines. Rather, the 3D visual search engine and the 2D visual search engine can share modules, processes, data, etc. as appropriate and/or as needed. In addition, the 3D image processing and the 2D image processing need not be performed at separate times but can be performed as needed using one or more processes that can be executed in parallel at the device 100, at one or more cloud server systems, or a combination thereof also as appropriate and/or as needed.

Figure 9:
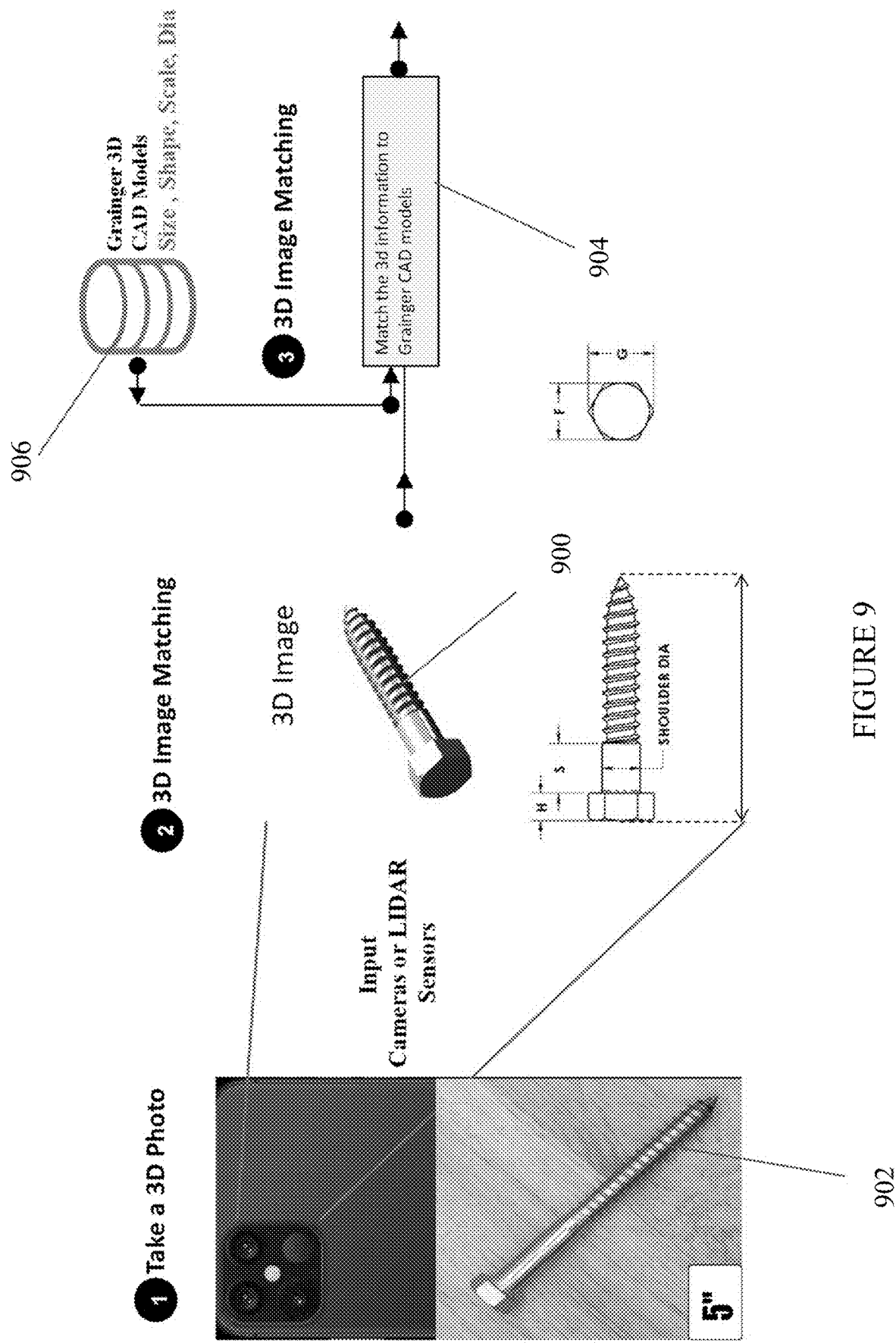
FIG. 9 illustrates an example method in which LiDAR is used to provide sizing information for use during the visual search process.
Figure 10:
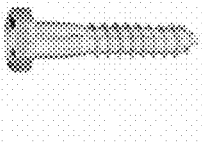
FIG. 10 illustrates an example search result resulting from an execution of the method illustrated in FIG. 9.

In a further search process generally illustrated in FIG. 9, one or more obtained product sizing estimations may also be used to provide product search results. In this example method, one or more image capturing elements 104, e.g., a LiDAR sensor, one or more cameras, etc., are used to obtain 3D image data 900 for an object of interest 902, e.g., a screw, and the obtained 3D image data 900 is additionally used to generate estimations of one or more size dimensions associated with the product. As needed, the object of interest 902 and the image capturing device 100 may be moved relative to one another to obtain the one or sizing size estimations. In the event the object of interest 902 and the image capturing device 100 are moved relative to one another to obtain size estimations for multiple views of the object, the processes described above that are used to detect an object of interest within a scene, to extract the object of interest from the scene, etc. may be repeated as needed, with the information obtained from the various views being cross-referenced to the object of interest for use in the visual search process. Once obtained, the 3D image 900 associated with the object of interest, including any generated sizing estimations for any one or more views of the object of interest, is, as described above, provided to a 3D visual search engine 904 and the 3D visual search engine 904 will use the shape and size data associated with the 3D image 900 to identity within a database of product information 906, e.g., a data store having 3D image data, such as derived from CAD models, for product sold by a vendor that is cross-referenced to product identifying information, such as a vendor stock keeping unit (SKU), product pricing, product availability, product parameters (materials, sizing, etc.), and the like as needed for any particular purpose. The product information identified by the 3D visual search engine as being a match (or a close match) for the data associated with the 3D image 900 of the object of interest 902 may then be provided to the user as a search result 1000, as shown in FIG. 10.

Figure 12:
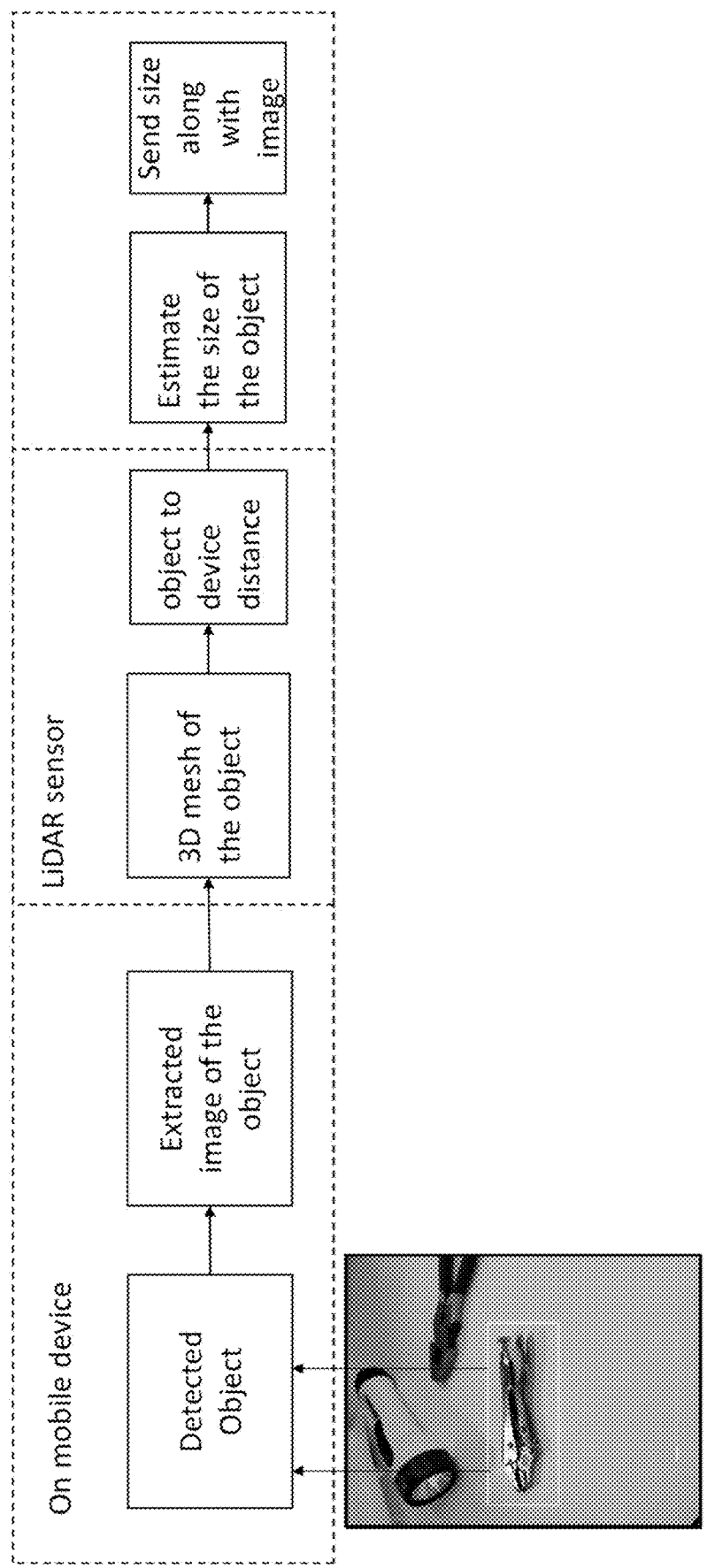
FIG. 12 illustrates an example search by image process.
Figure 13:
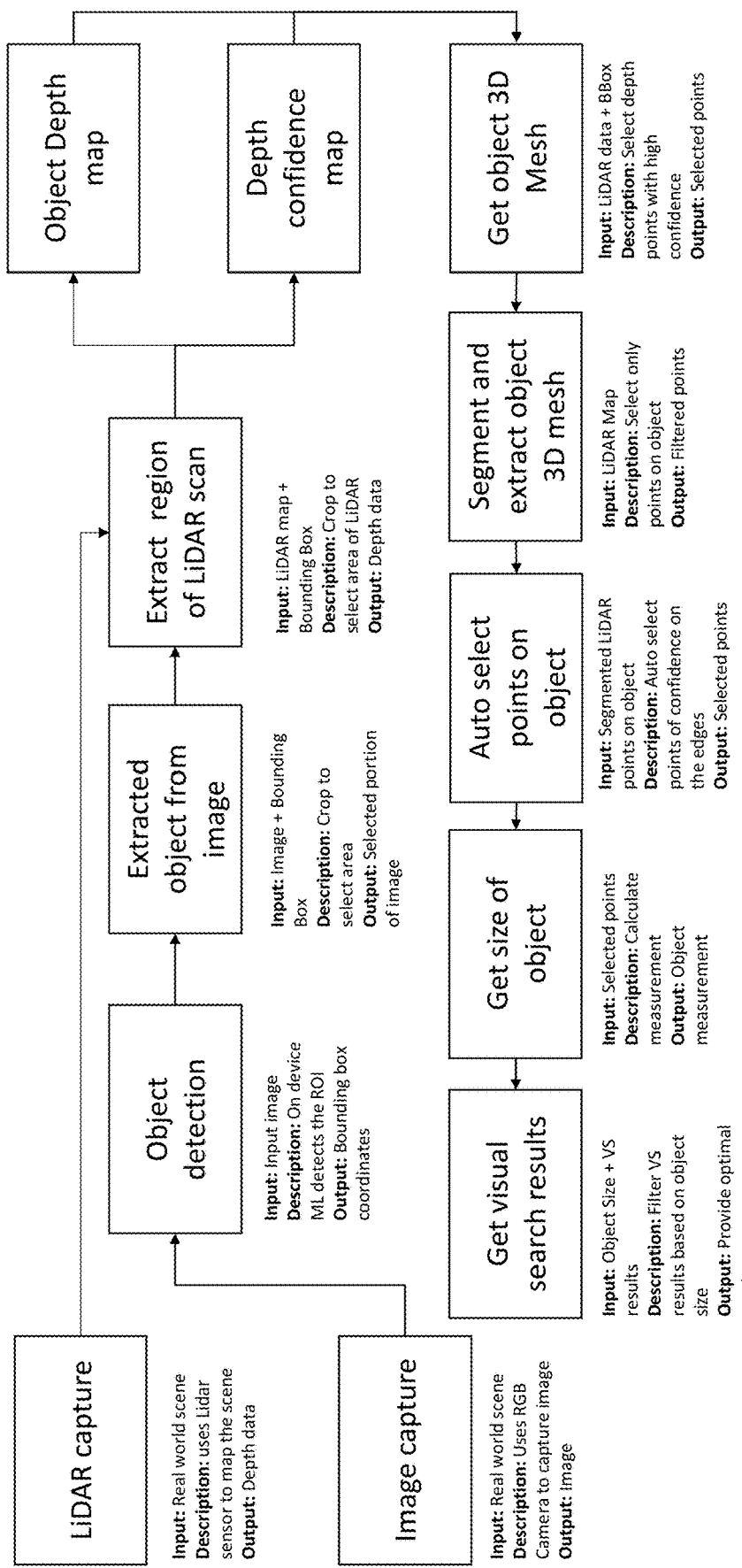
FIG. 13 illustrates the example process of FIG. 12 with further detail.

More particularly, to obtain search results with the use of 3D information, including sizing information, the methods illustrated in FIGS. 12 and 13 may be performed. Using the 2D and 3D imaging capabilities of the device 100, 3D and 2D image information for a scene is captured. The 2D image information may be used to determine an object of interest within a scene as described above in connection with FIGS. 1-6, e.g., via use of a bounding box, with the image information (and location information within the scene) for the determined object of interest then being extracted. In the case where both a 2D and a 3D visual search is performed, the 2D data for the object will be extracted and provided to a 2D search engine as described above. The determined bounding box/identification of the object of interest will also be used to extract from the 3D visual search information the 3D visual search information that is associated with the object of interest, e.g., a 3D mesh of the object is obtained from a depth map. Using the extracted 3D mesh of the object, points on the object can automatically selected and used to estimate size dimensions for the object, particularly using the object to device distance as is well-known in the art. This estimated size information and the obtained shape information may then be provided to the 3D search engine to obtain the search results as described previously. As needed, the 3D search results can be processed alone or with any 2D search results to determined which search results to provide to the end user.

Figure 11:
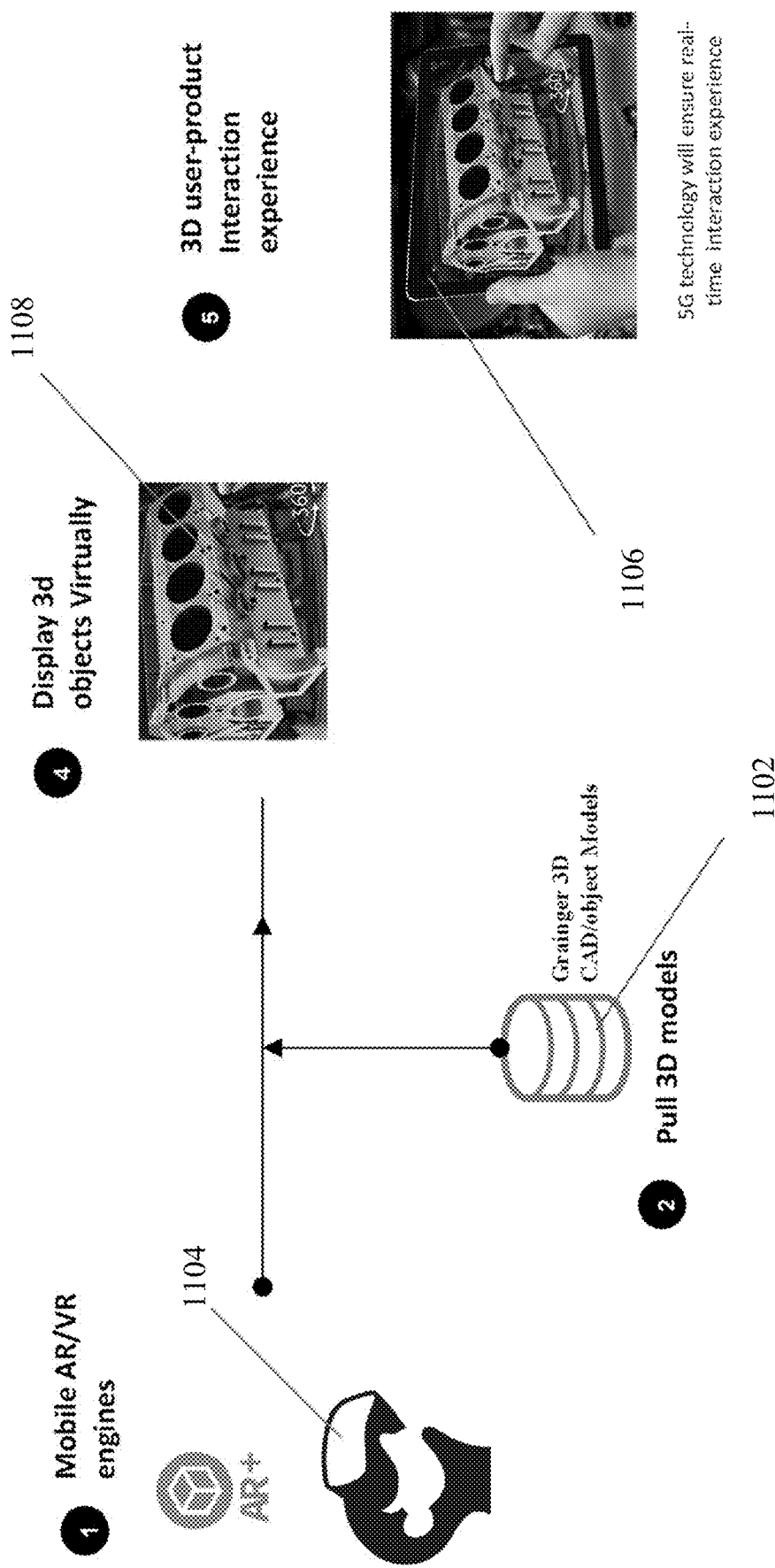
FIG. 11 illustrates an example method in which three-dimensional, computer aided drawing are used in providing an augmented reality or virtual reality experience.

As illustrated in FIG. 11, 3D product information stored in a database of product information 1102, such a CAD model data, can also be utilized to provide AR/VR on a device. For example, a user may be provided with a user interface to select a product of interest within the database 1102 and the CAD model data associated with the identified product of interest could be provided to a display device, such as a pair or AR/VR glasses 1104, a smart device 1106, etc. where the 3D product information can be used to provide a 3D, real-time AR/VR experience with a virtually displayed object 1108 to the user.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory, computer-readable media having stored thereon instructions, the instructions, when executed by a computing device, cause the computing device to perform steps comprising:

using data within an image frame being captured via use of an imaging element associated with the computing device to detect that an object within the image frame is a most prominently detected object within the image frame;

and in response to an expiration of a predetermined amount of time with the object continually being the most prominently detected object within the image frame, automatically providing at least a part of a three-dimensional (3D) information for the most prominently detected object within the image frame obtained via use of a 3D data obtaining system associated with the computing device to a cloud-based visual search process for the purpose of locating one or more matching products from within a product database for the most prominently detected object within the image frame with the located one or more matching products being returned to a customer as a product search result.

2. The non-transitory, computer-readable media as recited in claim 1, wherein the 3D data obtaining system comprises a LiDAR sensor associated with the computing device.

3. The non-transitory, computer-readable media as recited in claim 1, wherein the 3D data obtaining system comprises one or more cameras and processing for creating a stereoscopic image from image data captured via use of the one or more cameras.

4. The non-transitory, computer-readable media as recited in claim 1, wherein the 3D information for the most prominently detected object within the image frame comprises shape data and size estimation data for one or more portions of the most prominently detected object within the image frame.

5. The non-transitory, computer-readable media as recited in claim 1, wherein the instructions further cause a two-dimensional (2D) data associated with the most prominently detected object within the image frame as extracted from the image frame to be provided to the cloud-based visual search process for additional use in locating one or more matching products from within the product database for most prominently detected object within the image frame.

6. A method for providing search results, comprising:
using data within an image frame being captured via use of an imaging element associated with the computing device to detect that an object within the image frame is a most prominently detected object within the image frame;
and
in response to an expiration of a predetermined amount of time with the object continually being the most prominently detected object within the image frame, automatically providing at least a part of a three-dimensional (3D) information for the most prominently detected object within the image frame obtained via use of a 3D data obtaining system associated with the computing device to a cloud-based visual search process for the purpose of locating one or more matching products from within a product database for the most prominently detected object within the image frame with the located one or more matching products being returned to a customer as a product search result.

7. The method as recited in claim 6, wherein the 3D data obtaining system comprises a LiDAR sensor associated with the computing device.

8. The method as recited in claim 6, wherein the 3D data obtaining system comprises one or more cameras and processing for creating a stereoscopic image from image data captured via use of the one or more cameras.

9. The method as recited in claim 6, wherein the 3D information for the most prominently detected object within the image frame comprises shape data and size estimation data for one or more portions of the most prominently detected object within the image frame.

10. The method as recited in claim 6, further comprising causing a two-dimensional (2D) data associated with most prominently detected object within the image frame as extracted from the image frame to be provided to the cloud-based visual search process for additional use in locating one or more matching products from within the product database for the most prominently detected object within the image frame.

11. A computing device, comprising:
a processor;
an imaging system coupled to the processor;
a display element; and
memory including instructions that, when executed by the processor, enable the computing device to:
use data within an image frame being captured via use of an imaging element associated with the computing device to detect that an object within the image frame is a most prominently detected object within the image frame;
and
in response to an expiration of a predetermined amount of time with the object continually being the most prominently detected object within the image frame, automatically provide at least a part of a three-dimensional (3D) information for the most prominently detected object within the image frame obtained via use of a 3D data obtaining system associated with the computing device to a cloud-based visual search process for the purpose of locating one or more matching products from within a product database for the most prominently detected object within the image frame with the located one or more matching products being returned to a customer as a product search result.

12. The computing device as recited in claim 11, wherein the 3D data obtaining component comprises a LiDAR sensor associated with the computing device.

13. The computing device as recited in claim 11, wherein the 3D data obtaining component comprises one or more cameras and processing for creating a stereoscopic image from image data captured via use of the one or more cameras.

14. The computing device as recited in claim 11, wherein the 3D information for the most prominently detected object within the image frame comprises shape data and size estimation data for one or more portions of the most prominently detected object within the image frame.

15. The computing device as recited in claim 11, wherein the instructions further cause a two-dimensional (2D) data associated with the most prominently detected object within the image frame as extracted from the image frame to be provided to the cloud-based visual search process for additional use in locating one or more matching products from within the product database for the most prominently detected object within the image frame.

* * * * *